(12) United States Patent  
Charbonneau

(10) Patent No.: US 8,650,914 B2
(45) Date of Patent: Feb. 18, 2014

(54) METHODS AND APPARATUS FOR RECYCLING GLASS PRODUCTS USING SUBMERGED COMBUSTION

(75) Inventor: Mark William Charbonneau, Lakewood, CO (US)

(73) Assignee: Johns Manville, Denver, CO (US)

( * ) Notice: Subject to any disclaimer, the term of this patent is extended or adjusted under 35 U.S.C. 154(b) by 560 days.

(21) Appl. No.: 12/888,970

(22) Filed: Sep. 23, 2010

(65) Prior Publication Data
US 2012/0077135 A1    Mar. 29, 2012

(51) Int. Cl.
*C03B 3/00* (2006.01)
(52) U.S. Cl.
USPC ........... 65/482; 65/135.9; 65/136.2; 65/134.5
(58) Field of Classification Search
USPC ............................. 65/482, 135.9, 136.2, 134.5
See application file for complete search history.

(56) References Cited

U.S. PATENT DOCUMENTS

| | | |
|---|---|---|
| 2,718,096 A | 9/1955 | Henry et al. |
| 3,170,781 A | 2/1965 | Keefer |
| 3,224,855 A | 12/1965 | Plumat |
| 3,237,929 A | 3/1966 | Plumat et al. |
| 3,245,769 A | 4/1966 | Eck et al. |
| 3,260,587 A | 7/1966 | Dolf et al. |
| 3,606,825 A | 9/1971 | Johnson |
| 3,627,504 A | 12/1971 | Johnson |
| 3,738,792 A | 6/1973 | Feng |
| 3,764,287 A | 10/1973 | Brocious |
| 3,912,534 A * | 10/1975 | Gurta ............................... 134/19 |
| 4,309,204 A | 1/1982 | Brooks |
| 4,323,718 A | 4/1982 | Buhring |
| 4,397,692 A | 8/1983 | Ramge et al. |
| 4,422,862 A * | 12/1983 | Wardlaw ............................ 65/28 |
| 4,432,780 A | 2/1984 | Propster et al. |
| 4,539,034 A | 9/1985 | Hanneken |
| 5,100,453 A * | 3/1992 | Richards ............................ 65/27 |
| 5,199,866 A | 4/1993 | Joshi et al. |
| 5,299,929 A | 4/1994 | Yap |
| 5,352,258 A * | 10/1994 | DeGreve et al. ................. 65/474 |
| 5,360,171 A | 11/1994 | Yap |
| 5,449,286 A | 9/1995 | Snyder et al. |
| 5,483,548 A | 1/1996 | Coble |
| 5,490,775 A | 2/1996 | Joshi et al. |
| 5,545,031 A | 8/1996 | Joshi et al. |

(Continued)

FOREIGN PATENT DOCUMENTS

| EP | 2 397 446 A2 | 12/2011 |
|---|---|---|
| GB | 1 449 439 A | 9/1976 |

(Continued)

*Primary Examiner* — John Hoffmann
(74) *Attorney, Agent, or Firm* — Robert D. Touslee

(57) ABSTRACT

A method for recycling glass mat waste, wound rovings, and other products includes providing a source of glass mat, or a plurality of rovings, for example on a roll, and routing the glass mat or rovings into a submerged combustion melter. An unwind system and a pair of powered nip rolls, powered conveyors, or other arrangement may work in combination to provide a substantially consistent rate of material into the melter. The melter may operate under less than atmospheric pressure to avoid fumes escaping the melter. A slot in the melter allows ingress of the glass mat or rovings into the melter, and a glass mat former such as a folder may be used to ensure that the mat fits through the slot. Alternatively, the glass mat may be cut by a slitter prior to entering the slot.

7 Claims, 6 Drawing Sheets

(56) References Cited

U.S. PATENT DOCUMENTS

| | | |
|---|---|---|
| 5,575,637 A | 11/1996 | Slavejkov et al. |
| 5,709,728 A * | 1/1998 | Fleckenstein et al. ......... 65/482 |
| 5,772,126 A | 6/1998 | Hanvey et al. |
| 5,979,191 A | 11/1999 | Jian |
| 5,993,203 A | 11/1999 | Koppang |
| 6,029,477 A | 2/2000 | Hanvey |
| 6,244,197 B1 | 6/2001 | Coble |
| 6,460,376 B1 | 10/2002 | Jeanvoine et al. |
| 6,739,152 B2 | 5/2004 | Jeanvoine et al. |
| 6,857,999 B2 | 2/2005 | Jeanvoine |
| 6,883,349 B1 | 4/2005 | Jeanvoine |
| 7,273,583 B2 | 9/2007 | Rue et al. |
| 7,428,827 B2 | 9/2008 | Maugendre et al. |
| 7,448,231 B2 | 11/2008 | Jeanvoine et al. |
| 7,565,819 B2 | 7/2009 | Jeanvoine et al. |
| 2002/0162358 A1 | 11/2002 | Jeanvoine et al. |
| 2004/0168474 A1 | 9/2004 | Jeanvoine et al. |
| 2004/0224833 A1 | 11/2004 | Jeanvoine et al. |
| 2006/0000239 A1 | 1/2006 | Jeanvoine et al. |
| 2007/0122332 A1 | 5/2007 | Jacques et al. |
| 2007/0212546 A1 | 9/2007 | Jeanvoine et al. |
| 2008/0256981 A1 | 10/2008 | Jacques et al. |
| 2008/0276652 A1 | 11/2008 | Bauer |
| 2008/0302136 A1 | 12/2008 | Bauer et al. |
| 2009/0042709 A1 | 2/2009 | Jeanvoine et al. |
| 2010/0064732 A1 | 3/2010 | Jeanvoine et al. |
| 2011/0308280 A1 | 12/2011 | Charbonneau |

FOREIGN PATENT DOCUMENTS

| | | |
|---|---|---|
| JP | 2000351633 A | 12/2000 |
| JP | 2002120224 A | 4/2002 |
| WO | 2009/091558 A1 | 7/2009 |

\* cited by examiner

METHODS AND APPARATUS FOR RECYCLING GLASS PRODUCTS USING SUBMERGED COMBUSTION

BACKGROUND OF THE DISCLOSURE

1. Field of Disclosure

The present disclosure relates generally to the field of combustion furnaces and methods of use, and more specifically to improved submerged combustion melters and methods of use in producing molten glass from recycled glass mat and other rolled glass materials, such as wound rovings of continuous glass filament.

2. Related Art

Glass mat products such as fiber glass and mat and insulation mat are characterized by a nonwoven mat of glass fibers held together with a binder. Recycling or reclamation of glass mat products has been disclosed in and practiced previously. Many of these disclosed methods involve crushing the glass mat to a maximum fiber or particle size prior to re-melting. Other processes involve a heating step prior to grinding whereby the binder is first burned off without melting the glass fibers. In older processes the binders were typically desired to be removed prior to re-melting because the remnants of the binders may cause production of unsatisfactory glass products.

Submerged combustion has been proposed in several patents for application in commercial glass melting, including U.S. Pat. Nos. 4,539,034; 3,170,781; 3,237,929; 3,260,587; 3,606,825; 3,627,504; 3,738,792; 3,764,287; 6,460,376; 6,739,152; 6,857,999; 6,883,349; 7,273,583; 7,428,827; 7,448,231; 7,565,819, and 7,624,595; published U.S. Pat. Application numbers 2004/0168474; 2004/0224833; 2007/0212546; 2006/0000239; 2002/0162358; 2009/0042709; 2008/0256981; 2007/0122332; 2004/0168474; 2004/0224833; 2007/0212546; and 2010/0064732; and published PCT patent application WO/2009/091558, all of which are incorporated herein by reference in their entireties. In submerged combustion glass melting, the combustion gases are injected beneath the surface of the molten glass and rise upward through the melt. The glass is heated at a higher efficiency via the intimate contact with the combustion gases. However, submerged combustion burners have not heretofore been used to recycle or reclamate glass mat products without first crushing the mat products to reduce the size of the glass fibers.

U.S. Pat. No. 4,397,692 discloses methods and apparatus for the reclamation of inorganic fibers from waste continuous strips of inorganic fibers. The '692 patent mentions another, previous recapture technique is to feed the recaptured fibers directly into the melting furnace with virgin glass batch. The difficulty with this approach, according to the '692 patentees, is that a major amount of the cost of the fiber is not in the material but, in the cost of production and, by melting the fibers, that amount is lost. In addition, the cost of processing the fibers for feeding to a batch furnace is equal to or greater than the cost of the batch it replaces, making this process economically unattractive. According to the Abstract of the '692 patent, a binding agent, such as an organic binder, must be removed before the fibers can be reused or further processed. One or more layers of continuous strips are conveyed to a heating zone where the strips are supported along a predetermined path as a heating fluid is drawn rapidly through the strips to decompose the binder. Unfortunately, the '692 patent suggests that in the case where binder is still present on the fibers in unacceptable levels, these non-reclaimable fibers may be dumped for subsequent disposal. This practice is now unacceptable, due to the lack of landfill space available, and due to the justifiably increased concern for the environment. The '692 patent does not disclose, teach or suggest roll-feeding of fiber glass mat scrap or rovings, or folding shoes, or nip rollers being used to feed fiberglass mat scrap to a melter.

U.S. Pat. No. 4,422,862 describes a process for feeding scrap glass to a glass melting furnace. The scrap glass is fed onto a blanket of batch in the furnace so that organics are burned off before the scrap melts. The scrap glass is either first hammermilled or crushed before it is fed to the glass melting furnace, or enters the furnace in the form of fluffy, fine textured scrap that floats on the batch blanket. There is no teaching or suggestion of roll-feeding, or folding shoes, or of nip rollers being used to feed the scrap to the melter. There is disclosed use of a conveyor belt, but the patentee states "In FIG. 2, scrap glass is manually fed onto belt conveyor 12 at a controlled rate. The cullet glass previously has been processed through a crusher (not shown)." Clearly, crushing is involved, as the patentee states "the crushing advantages are fluffy fine textured scrap that floats on the batch cover allowing good penetration and binder burn-off by furnace gases."

U.S. Pat. No. 4,432,780 discloses a method of reclaiming chemically coated glass scrap. The scrap is introduced into the oxidizing atmosphere of a hydrocarbon-fuel fired glass melting furnace. Some of the glass is melted with the unmelted portion being melted with the glass batch as it moves through the furnace. The patentees state that "The scrap glass can be introduced into the furnace in any suitable form. Preferably, it will be introduced in particulate form up to about 1¼ inch screen size by means of a blowing wool machine, one or more machines being used depending upon the quantity of scrap glass being introduced." Despite the broad introductory statement that "the scrap glass can be introduced in any suitable form", the particulate form is the only form that is disclosed. Thus, this patent fails to disclose, teach, or suggest roll-feeding, or folding shoes, or of nip rollers being used to feed scrap to the melter.

U.S. Pat. No. 4,309,204 discloses a process and apparatus for remelting scrap glass fibers. The removal of binder and remelting of the scrap are carried out in one operation, and the resulting molten scrap fibers are fed directly into a conventional glass melting furnace. Granular raw glass batch also is fed into the glass melting furnace. FIGS. 1 and 2 of the '204 patent show a glass feeder feeding glass strands to a melter through rotating shaft feeders. Thus, this patent fails to disclose, teach, or suggest roll-feeding of fiber glass mat scrap or rovings, or folding shoes, or nip rollers being used to feed fiberglass mat scrap to a melter.

JP 2000351633 is another example method and apparatus for recycling fiber glass waste. The reference discloses use of a burner to feed waste glass fiber to a glass melting tank furnace. The recycling apparatus is provided with a hopper for storing waste glass fiber cut to proper size and a constant-rate discharging apparatus to discharge the waste material at a constant rate. This reference fails to disclose, teach, or suggest roll-feeding of fiber glass mat scrap or rovings, or folding shoes, or nip rollers being used to feed fiberglass mat scrap to a melter.

JP 2002120224 discloses a method for recycling glass fiber-reinforced thermoplastic resin characterized by feeding the glass fiber-reinforced thermoplastic resin for recycling to a vessel wherein a non-recycled thermoplastic resin is under melted condition. Thus, the approach here is not to feed the fiber glass reinforced waste into a glass tank furnace, but into a tank of molten thermoplastic resin. This reference therefore fails to disclose, teach, or suggest roll-feeding of fiber glass mat scrap or rovings, or folding shoes, or nip rollers being used to feed fiberglass mat scrap to a glass tank melter.

It would be an advance in glass mat recycling to develop methods and apparatus for recycling and/or reclaiming glass mat and similar items, such as wound roving of continuous glass filament, that avoid the significant processing needed to shred such materials and/or mill it into a fine powder for re-melting, while taking advantage of the efficiency of submerged combustion burners, to increase melter throughput and produce high quality molten glass.

SUMMARY

In accordance with the present disclosure, methods and apparatus for practicing the methods are described for recycling rolled glass materials, such as glass mat and wound rovings, that reduce or eliminate the need to shred or crush such glass materials before feeding same into a glass tank melter, and that take advantage of the efficiency of submerged combustion burners.

Various terms are used throughout this disclosure. A "web" refers to woven and nonwoven mats of glass fiber, and is typically, but not necessarily, rolled up into a roll. "Mat" as used herein refers to lofted and non-lofted (essentially flat) nonwoven glass fiber articles. An example of a lofted nonwoven is glass fiber insulation batting, while an example of a non-lofted nonwoven is E-Glass mat as is commonly used in roofing shingles and other high-performance applications. "Roving" as used herein refers to a plurality of filaments of glass fiber substantially parallel to a major axis of the roving. "Scrap" is a general term for glass fiber mat pieces, rovings, or other rolls of material that, for one reason or another, is off-specification or trimmed from a larger web of useable material, and would otherwise be landfilled, but for the teaching of the present disclosure. "Submerged" as used herein means that combustion gases emanate from burners under the level of the molten glass; the burners may be floor-mounted, wall-mounted, or in melter embodiments comprising more than one submerged combustion burner, any combination thereof (for example, two floor mounted burners and one wall mounted burner). As used herein the term "combustion gases" means substantially gaseous mixtures of combusted fuel, any excess oxidant, and combustion products, such as oxides of carbon (such as carbon monoxide, carbon dioxide), oxides of nitrogen, oxides of sulfur, and water. Combustion products may include liquids and solids, for example soot and unburned liquid fuels. "Oxidant" as used herein includes air and gases having the same molar concentration of oxygen as air, oxygen-enriched air (air having oxygen concentration of greater than 21 mole percent), and "pure" oxygen, such as industrial grade oxygen, food grade oxygen, and cryogenic oxygen. Oxygen-enriched air may have 50 mole percent or more oxygen, and in certain embodiments may be 90 mole percent or more oxygen. Oxidants may be supplied from a pipeline, cylinders, storage facility, cryogenic air separation unit, membrane permeation separator, or adsorption unit.

A first aspect of this disclosure is a method comprising:
a) providing a source of glass mat or wound roving; and
b) routing the glass mat or wound roving at a substantially consistent feed rate into a submerged combustion melter and melting the glass mat or roving.

As used herein the phrase "substantially consistent feed rate" means that the rate of glass mat or roving entering the melter is, in certain embodiments, constant, but may in certain embodiments vary from constant by a small percentage, for example +/−1 percent, or +/−5 percent, or +/−10 percent.

In certain embodiments, the mass of a particular web of glass mat or roving per unit of length may not vary significantly as the web or roving is fed into the melter, and in these embodiments the web or roving feed rate (unit of length per unit of time) may not need to vary significantly in order to maintain a substantially consistent feed rate (mass per unit of time) of glass mat or roving into the melter. In certain other embodiments, the mass of a particular web of glass mat or roving may vary with length (for example the web or rovings may decrease in mass as the web or rovings is/are unwound from a roll), and in these instances the linear speed of the web or rovings may be increased so that the feed rate of material into the melter remains substantially consistent over time. In certain methods and apparatus of this disclosure the substantially consistent feed rate may be accomplished by unwinding a web of the glass mat or one or more wound rovings off of one or more rolls using a combination of an unwind system and a pair of powered nip rolls, conveyers, or other arrangement. In certain embodiments, the powered nip rolls could be supplemented with or replaced by a nip compression conveyor, or opposed conveyors compressing the product to accomplish the same aim. To avoid repetition, the term "powered nip rolls" will be used herein, with the understanding that these other arrangements could be used just as well. In certain embodiments, the mat or rovings may be chopped downstream or integral to the nip rollers and/or conveyors and prior to entering the glass tank furnace.

The source of glass mat may be selected from the group consisting of nonwovens and woven materials. Nonwovens may be lofty or non-lofty. High loft is thick and fluffy, low loft is thin and dense. The higher the loft, the better the insulation characteristic.

In certain embodiments, the nonwoven is a non-lofty mat, such as a mat of E-Glass fibers. Such mats are often used in constructing roofing shingles.

In certain embodiments, the method comprises providing a web of substantially continuous glass fibers bound together randomly at points where adjacent fibers touch using a binder.

In certain embodiments, the glass mat and/or rovings enter the submerged combustion melter through a slot in the melter and then directly into molten glass within the melter.

In certain embodiments, more particular to embodiments where glass mat is processed may be rout the glass mat through a forming or converting device prior to entering the powered nip rolls so that the glass mat fits through the slot. One example of such a forming or converting device is a folding device. Another example of a forming device is a cutting or slitting device wherein the glass mat is cut to width prior to entering the powered nip rolls so that the glass mat fits through the slot.

In certain embodiments, the unwinding of the roll comprises changing rolls on the fly, which may comprise splicing a first web unwinding from a first roll to a second web unwinding from a second roll.

In certain methods the melting comprises at least one burner directing combustion products into a melting zone under a level of molten glass in the zone.

In certain methods at least some heat used for the melting of the glass mat and/or roving comprises heat from combustion of at least some of the binder.

In certain methods the melter is operated at a pressure less than atmospheric pressure. These methods may ensure that any combustion products generated during the melting of the glass remain in the system and do not escape through the feed slot.

Another aspect of this disclosure are apparatus comprising:
a) a source of rolled glass mat or wound roving material;

b) a submerged combustion melter having a slot for feeding the glass mat or wound roving material into the melter and one or more submerged combustion burners; and c) a pair of powered nip rolls for feeding the glass mat or wound roving material into the melter at a substantially consistent rate.

In certain apparatus embodiments, the apparatus comprises an unwind subsystem for unwinding the rolled glass mat or wound roving in combination with the powered nip rolls. Certain embodiments include a glass mat forming device positioned prior to the powered nip rolls so that the glass mat is formed to fit through the slot. Folding, cutting and/or slitting the mat to an acceptable width to fit the mat through the slot are examples of forming devices. Two or more functions of folding, cutting, and the like may be combined in one forming device.

Certain apparatus embodiments of this disclosure may include melters comprising fluid-cooled panels, wherein the slot is covered and integral with a fluid-cooled panel of a wall of the melter. In certain other embodiments, the slot may be integral with an exhaust port or roof of the melter. In certain embodiments, the slot may comprise one or more hinged doors or panels. In certain other embodiments the slot may comprise one or more sliding doors or panels. Certain embodiments may comprise both hinged and sliding doors or panels. The hinged and sliding doors may be water cooled, or cooled by other fluids.

In practice, the submerged combustion melter may include one or more submerged combustion burners comprising one or more oxy-fuel combustion burners.

In all apparatus embodiments the sources of oxidant and fuel may be one or more conduits, pipelines, storage facility, cylinders, or, in the case of oxidant, ambient air. Secondary and tertiary oxidants, if used may be supplied from a pipeline, cylinder, storage facility, cryogenic air separation unit, membrane permeation separator, or adsorption unit such as a vacuum swing adsorption unit.

Certain embodiments may comprise using oxygen-enriched air as the primary oxidant, the fuel is a gaseous fuel, the gaseous fuel being selected from methane, natural gas, liquefied natural gas, propane, carbon monoxide, hydrogen, steam-reformed natural gas, atomized oil or mixtures thereof, and the oxygen-enriched air comprising at least 90 mole percent oxygen. In certain embodiments the oxygen may be injected into an intermediate mixture upstream of a combustion chamber of a burner, while in other embodiments the oxygen may be injected into the combustion chamber.

Apparatus and process embodiments of the disclosure may be controlled by one or more controllers. For example, burner combustion (flame) temperature may be controlled by monitoring one or more parameters selected from velocity of the fuel, velocity of the primary oxidant, mass and/or volume flow rate of the fuel, mass and/or volume flow rate of the primary oxidant, energy content of the fuel, temperature of the fuel as it enters the burner, temperature of the primary oxidant as it enters the burner, temperature of the effluent, pressure of the primary oxidant entering the burner, humidity of the oxidant, burner geometry, combustion ratio, and combinations thereof. Apparatus and processes of this disclosure may also measure and/or monitor feed rate of glass mat or wound roving, mass of glass mat or wound roving per unit length, web or roving linear speed, and combinations thereof, and use these measurements for control purposes. Exemplary apparatus and methods of the disclosure comprise a combustion controller which receives one or more input parameters selected from velocity of the fuel, velocity of the primary oxidant, mass and/or volume flow rate of the fuel, mass and/or volume flow rate of the primary oxidant, energy content of the fuel, temperature of the fuel as it enters the burner, temperature of the primary oxidant as it enters the burner, pressure of the oxidant entering the burner, humidity of the oxidant, burner geometry, oxidation ratio, temperature of the effluent and combinations thereof, and employs a control algorithm to control combustion temperature based on one or more of these input parameters.

Apparatus and methods of the disclosure will become more apparent upon review of the brief description of the drawings, the detailed description of the disclosure, and the claims that follow.

BRIEF DESCRIPTION OF THE DRAWINGS

The manner in which the objectives of the disclosure and other desirable characteristics can be obtained is explained in the following description and attached drawings in which.

It is to be noted, however, that the appended drawings are not to scale and illustrate only typical embodiments of this disclosure, and are therefore not to be considered limiting of its scope, for the disclosure may admit to other equally effective embodiments.

DETAILED DESCRIPTION

In the following description, numerous details are set forth to provide an understanding of various apparatus and process embodiments in accordance with the present disclosure. However, it will be understood by those skilled in the art that the apparatus and processes of using same may be practiced without these details and that numerous variations or modifications from the described embodiments may be possible which are nevertheless considered within the appended claims.

Figure 1:
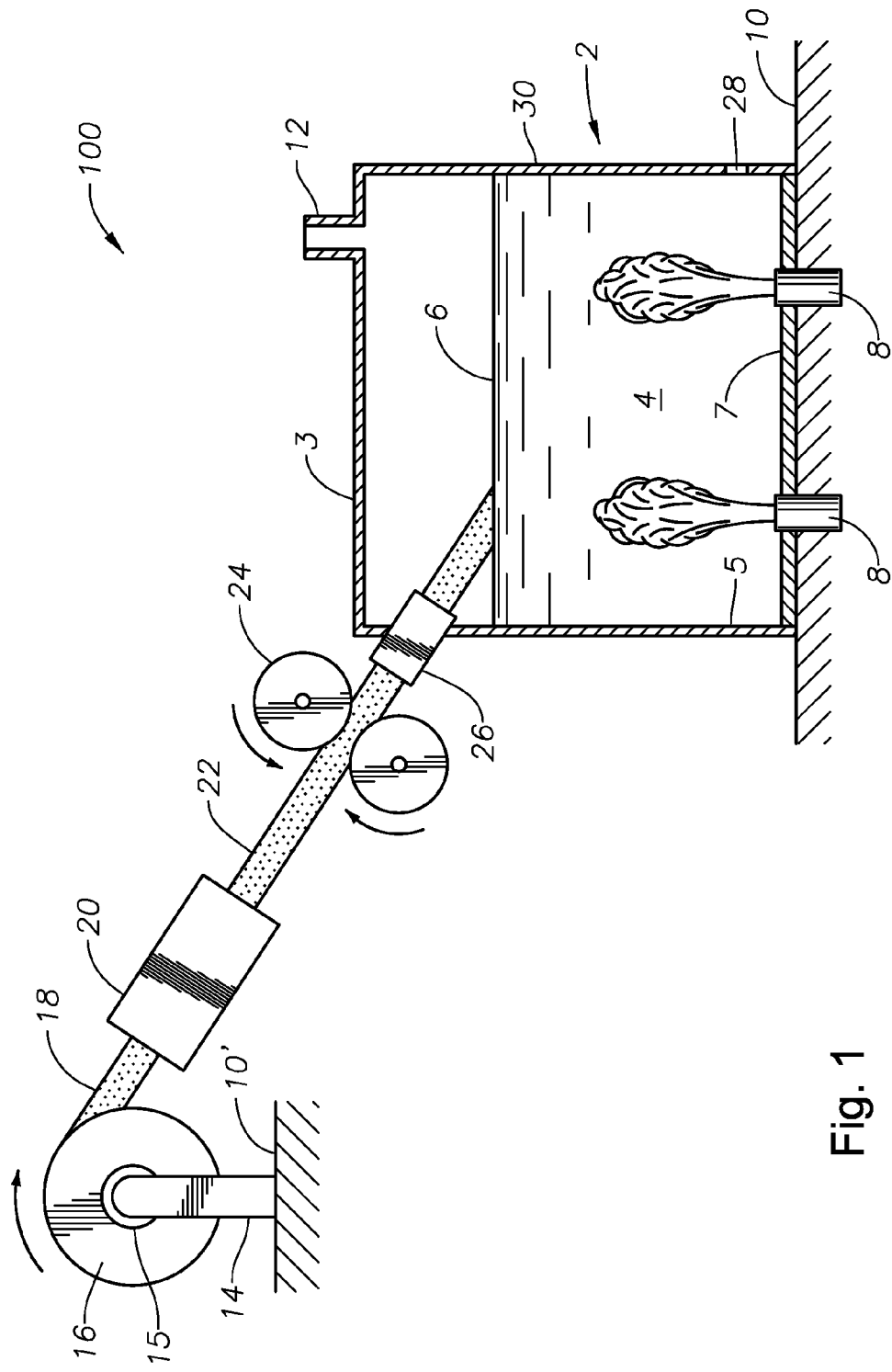
FIGS. 1 and 2 are schematic side elevation views, with some parts broken away, of two apparatus and process embodiments in accordance with the present disclosure.
Figure 2:
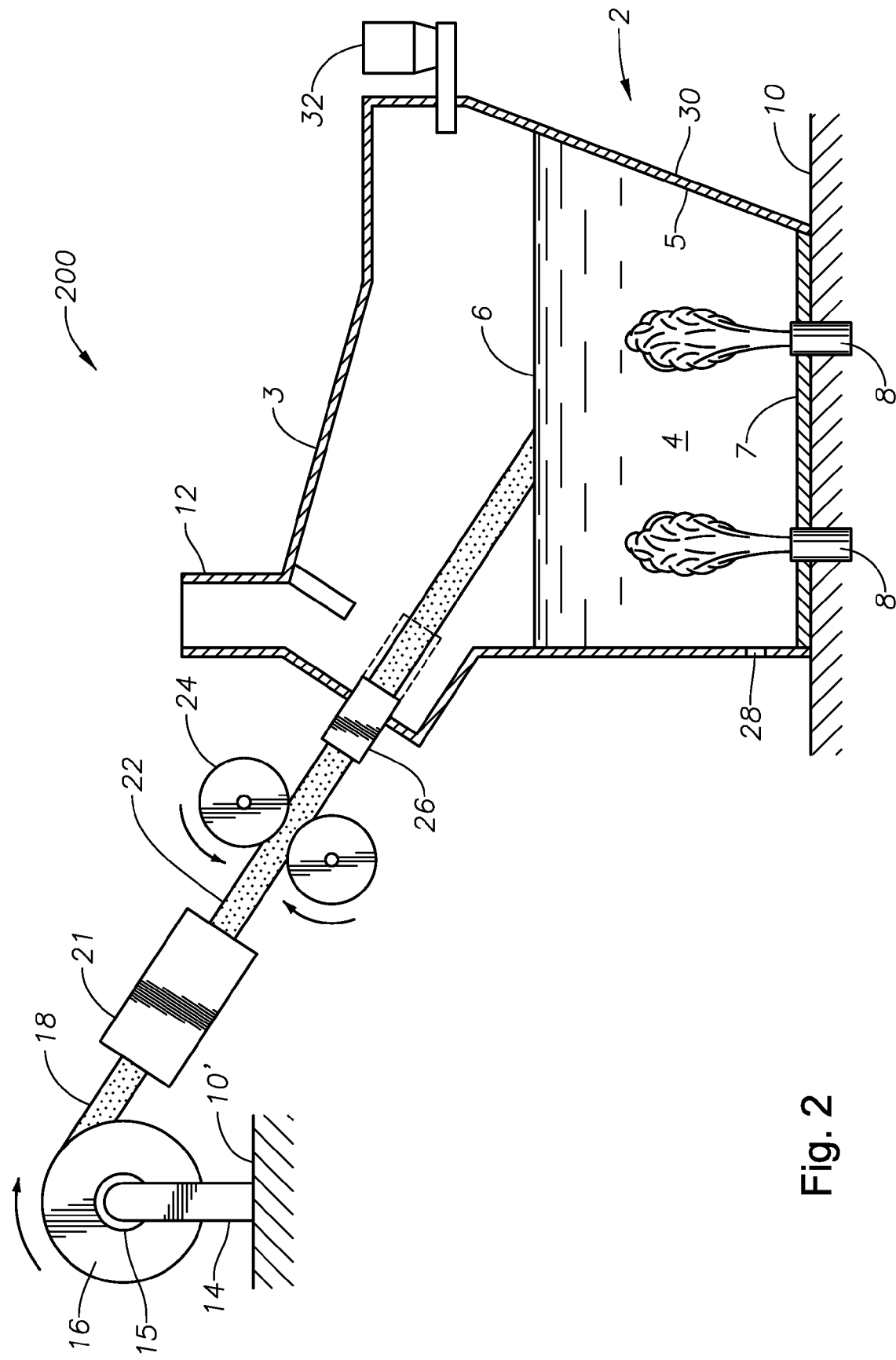

Referring now to the figures, FIGS. 1 and 2 are schematic side elevation views, with some parts broken away, of two apparatus and process embodiments in accordance with the present disclosure. The same numerals are used for the same or similar features in the various figures. In the views illustrated in FIGS. 1 and 2, it will be understood in each case that the figures are schematic in nature, and certain conventional features are not illustrated in order to illustrate more clearly the key features of each embodiment.

Embodiment 100 of FIG. 1 comprises a melter 2, which may be any of the currently known submerged combustion melter designs as exemplified in the patent documents previously incorporated hereby reference in the Background of the present disclosure, or may be one of those described in assignee's currently pending patent application Ser. No. 12/817,754, filed Jun. 17, 2010, incorporated herein by reference. Melter 2 includes a roof 3, side walls 5, a floor 7, one or more submerged combustion burners 8, an exhaust chute 12, one or more molten glass outlets 28 (only one being illustrated), and fluid-cooled panels 30 comprising some or all of side walls 5. Molten glass 4 is sometimes referred to herein simply as the "melt", and has a level 6 in melter 2. Melter 2 is typically supported on a plant floor 10.

In accordance with the present disclosure, first embodiment 100 comprises one or more roll stands 14 (only one being illustrated), which in turn supports one or more rolls 16 of glass mat. Roll stand 14 connects to roll 16 though an unwind driver and brake combination 15, which are known in the roll-handling art. Roll stand 14 is supported by a plant floor 10', which may be the same or different floor as floor 10 which supports melter 2 (in other words, roll stand 14 may be supported by a second floor of a plant or facility, although this is not necessary to practice the methods and apparatus of this disclosure).

Other components of embodiment 100 include a glass mat forming device 20, a set of powered nip rolls 24, and a glass mat feed slot 26. In certain embodiments, as mentioned previously, powered nip rolls 24 may be supplemented with or replaced by a nip compression conveyor, or opposed conveyors compressing the product to accomplish the same aim. Forming device 20 is optional, but when present, may be selected from any one or more devices providing one or more functions, for example, but not limited to cutting, slitting (cutting in longitudinal direction), folding, shaping, compacting, pressing, coating, spraying, heating, cooling, and the like, and combinations thereof. An example of a single device providing two functions would be a device providing both heating and folding. The powered nip rolls 24 may also provide some degree of heating, cooling, compressing, and other forming function or functions, although their primary function is to draw the glass mat web off of roll 16, in conjunction with unwind driver/brake combination 15. In certain embodiments, as mentioned previously, the powered nip rolls may include cutting knives or other cutting components to cut or chop the mat (or roving, in those embodiments processing rovings) into smaller length pieces prior to entering melter 2.

In operation of embodiment 100 of FIG. 1, glass mat 18 is unwound from a roll of glass mat in conjunction with powered nip rolls 24. Glass mat 18 may be, for example, but not limited to glass mat scrap. Glass mat 18 optionally is routed through one or more forming devices 20 to form a formed glass mat 22. Powered nip rolls 24 then route formed glass mat 22 through feed slot 26, which feeds the glass mat directly into the molten glass 4. Glass mat 22 may be fed into molten glass 4 from above the level 6, as illustrated in embodiment 100 of FIG. 1. Alternatively, in certain embodiments, all or a portion of glass mat 22 may be routed under the level 6 of molten glass 4. Whether the glass mat is fed directly to molten glass 4 through level 6, or all or a portion is fed under level 6 depends on factors such as the configuration and pull rate of melter 2.

Referring now to FIG. 2, embodiment 200 is illustrated. In embodiment 200, melter 2 has a slightly different exhaust chute 12 configuration, and in embodiments such as this, it may be more convenient to position feed slot 26 in exhaust chute 12 and feed glass mat 22 (or wound roving) through feed slot 26 and exhaust chute 12, as illustrated. A dashed, phantom portion of feed slot 26 is illustrated as an extension, which may be present in certain embodiments to ensure that glass mat web 22 enters molten glass 4 in a desired location. Any location is possible, but for the limitation that glass mat is molten before leaving molten glass outlet 28. Also provided in this embodiment is a glass batch feeder 32. Glass batch feeders are well-known in this art and require no further explanation. A glass mat web cutting device 21 is provided in this embodiment.

Figure 3:
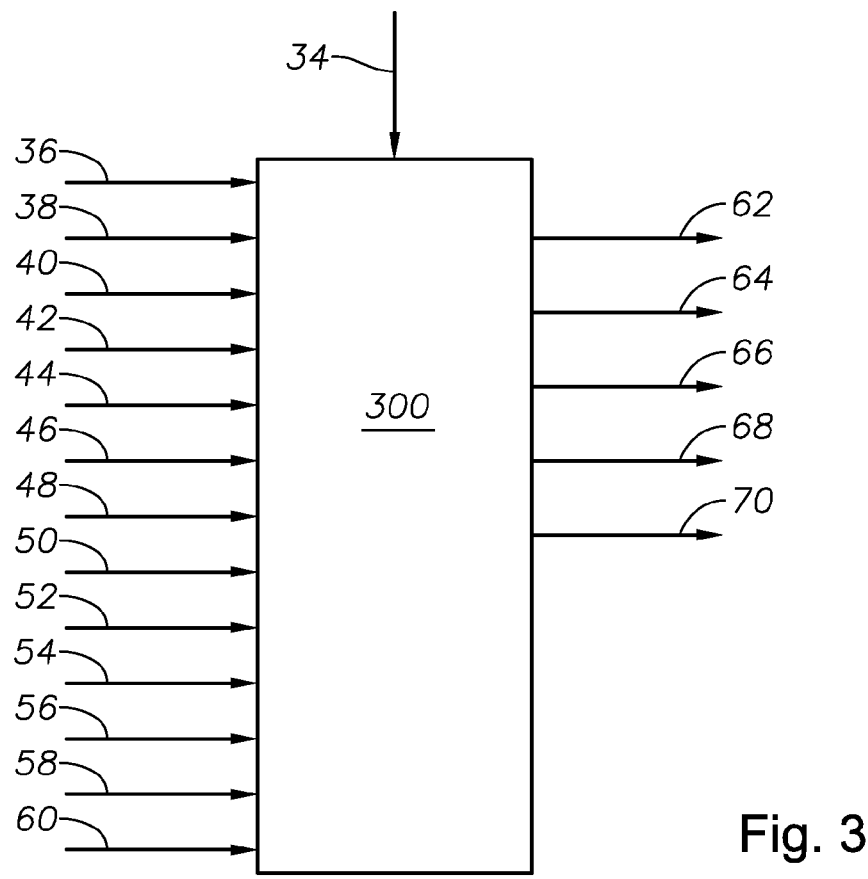
FIG. 3 is one embodiment of a process control schematic diagram for the apparatus and processes of FIGS. 1 and 2.

FIG. 3 is a schematic diagram of one embodiment of a process control scheme for the apparatus and processes of FIGS. 1 and 2. A master process controller 300 may be configured to provide any number of control logics, including feedback control, feed-forward control, cascade control, and the like. The disclosure is not limited to a single master process controller 300, as any combination of controllers could be used. The controller may be selected from PI controllers, PID controllers (including any known or reasonably foreseeable variations of these), and computes a residual equal to a difference between one or more measured values 36, 38, 40, 42, 44, 46, 48, 50, 52, 54, 56, 50, and 60 and one or more set points 34, for example feed rate (mass/time) of glass mat or rovings into melter 2, to produce one or more outputs 62, 64, 66, 68, and 70 to one or more control elements. The controller 300 may compute the residual continuously or non-continuously. Other possible implementations of the disclosure are those wherein the controller comprises more specialized control strategies, such as strategies selected from internal feedback loops, model predictive control, neural networks, and Kalman filtering techniques. In FIG. 3, the lines numbered 36, 38, 40, 42, 44, 46, 48, 50, 52, 54, 56, 50, and 60 may represent sensors, for example sensors for the following parameters, which are merely exemplary examples:

36=weight of mat or roving (mass/length);
38=unwind speed of mat or roving (length/time);
40=temperature of melt 4;
42=temperature of fuel entering a burner;
44=temperature of oxidant entering a burner;
46=temperature of exhaust form melter;
48=level of melt in melter;
50=mass flow rate of fuel entering burner;
52=mass flow rate of primary oxidant entering burner;
54=energy content of fuel;
56=humidity of primary oxidant;
58=width of glass mat web or roving from roll;
60=flow rate of melt out of melter;

The lines numbered 62, 64, 66, 68, and 70 may represent control signals and actuators, respectively, for outputs for the following parameters, which are merely exemplary:

62=corrected mass flow rate of fuel to burners;
64=corrected mass flow of oxidant to burners;
66=corrected speed of unwinding of roll of glass mat or roving;
68=corrected nip roll speed; and
70=corrected flow of melt out of melter.

Other parameters may be included as inputs, such as weight of roll, burner geometry, and combustion ratio.

The term "control", used as a transitive verb, means to verify or regulate by comparing with a standard or desired value. Control may be closed loop, feedback, feed-forward, cascade, model predictive, adaptive, heuristic and combinations thereof. The term "controller" means a device at least capable of accepting input from sensors and meters in real time or near-real time, and sending commands directly to burner control elements, and/or to local devices associated with burner control elements and glass mat feeding devices able to accept commands. A controller may also be capable of accepting input from human operators; accessing databases, such as relational databases; sending data to and accessing data in databases, data warehouses or data marts; and sending information to and accepting input from a display device readable by a human. A controller may also interface with or have integrated therewith one or more software application modules, and may supervise interaction between databases and one or more software application modules.

The controller may utilize Model Predictive Control (MPC). MPC is an advanced multivariable control method for use in multiple input/multiple output (MIMO) systems. An overview of industrial Model Predictive Control can be found on the Internet, which will direct the reader to many sources, including textbooks. MPC computes a sequence of manipulated variable adjustments in order to optimise the future behavior of the process in question. At each control time k, MPC solves a dynamic optimization problem using a model of the controlled system, so as to optimize future behavior (at time k+1, k+2 . . . k+n) over a prediction horizon n. This is again performed at time k+1, k+2 . . . MPC may use any derived objective function, such as Quadratic Performance Objective, and the like, including weighting functions of manipulated variables and measurements. Dynamics of the process and/or system to be controlled are described in an explicit model of the process and/or system, which may be obtained for example by mathematical modeling, or estimated from test data of the real process and/or system.

Figure 4:
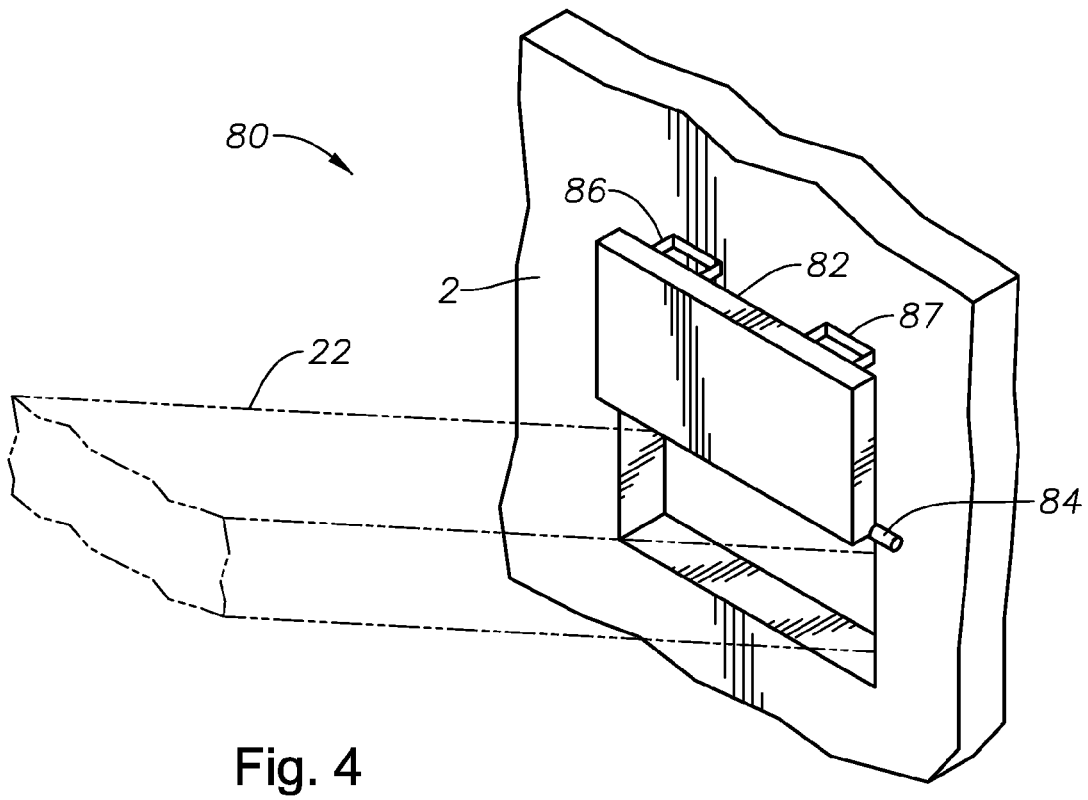
FIGS. 4-8 illustrate perspective and side elevation (FIG. 6) views of four embodiments of slots useful in the apparatus and processes in the present disclosure.

FIGS. 4-8 illustrate non-limiting examples of slots useful in apparatus and methods of this disclosure. FIG. 4 illustrates a perspective view of embodiment 80, having a single door or panel 82 which swings open vertically away from melter 2 when it is desired to feed a non-woven 22 into melter 2 for recycling. Door or panel 82 is secured to melter 2 by a hinge 84 which ruins along the bottom edge of door 82, and handles 86, 87 are provided in this embodiment to allow personnel to open and close door 82. Alternatively, or in addition, a mechanical opening and closing mechanism may be provided, such as that discussed in reference to FIG. 7, or equivalent thereof.

Figure 5:
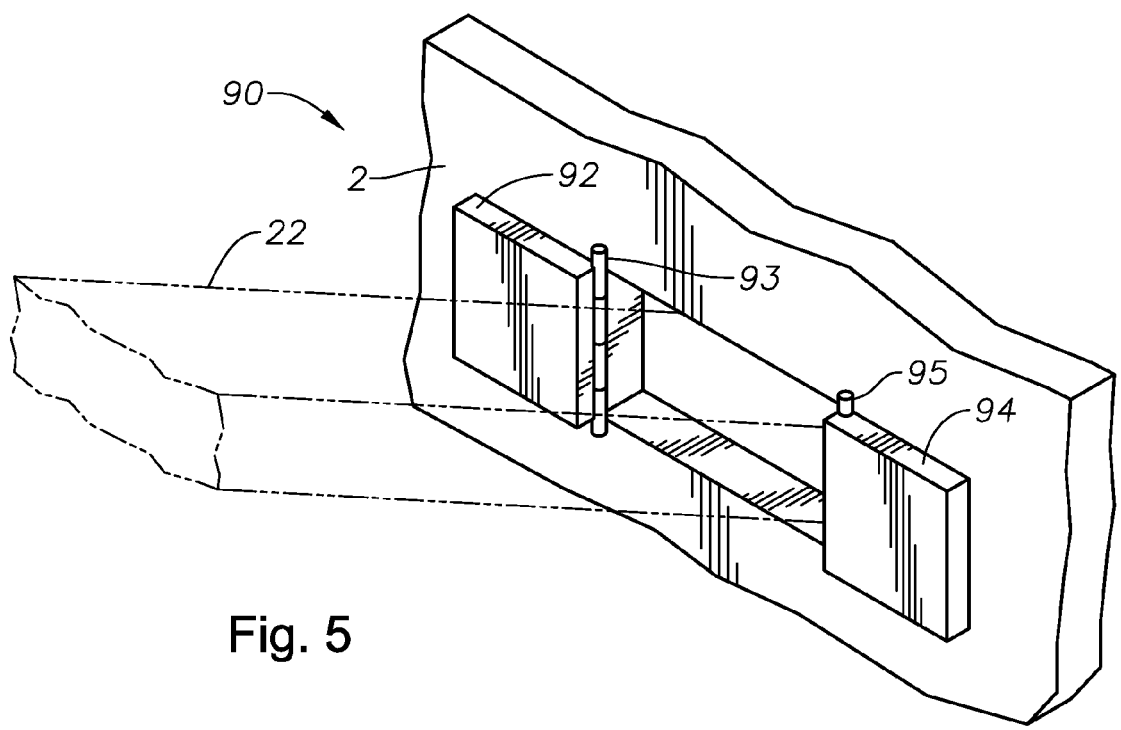

FIG. 5 illustrates a perspective view of another embodiment 90 within this disclosure, this embodiment comprising a pair of horizontally opening doors 92, 94, also featuring hinged connections 93, 95, connecting the doors to melter 2, respectively.

Figure 6:
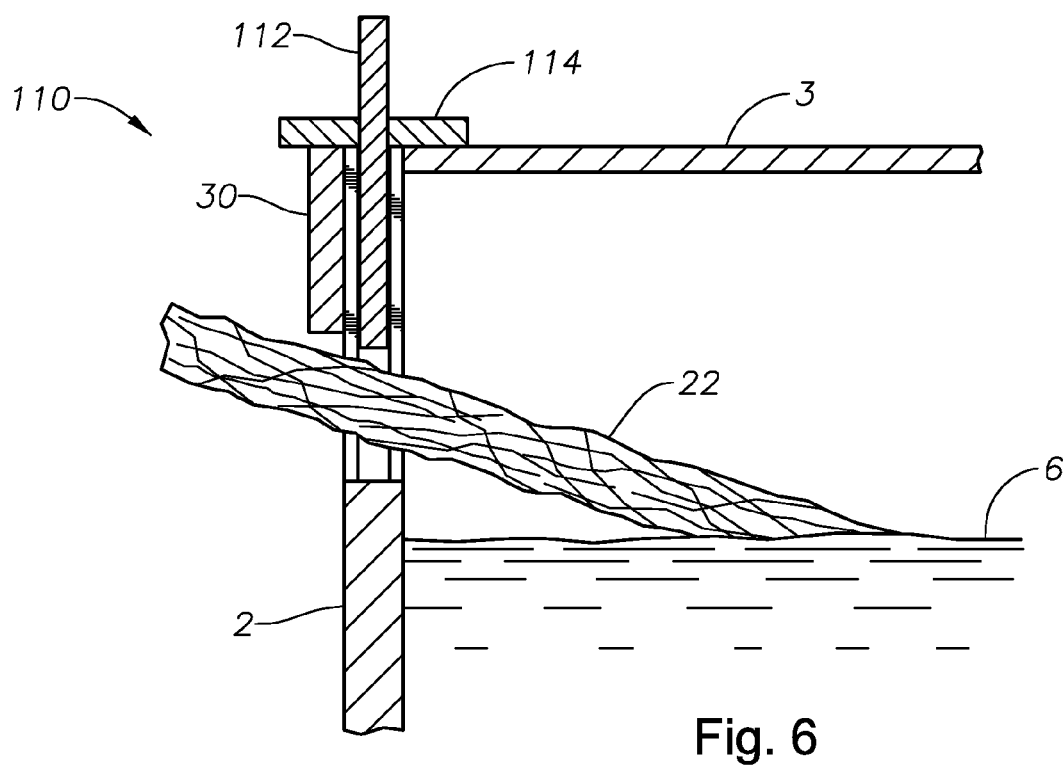

FIG. 6 illustrates a side elevation view of an embodiment 110 of a vertical sliding door or panel 112 which may function as a slot in accordance with the present disclosure, where panel 112 is integral with a fluid-cooled wall 30 of melter 2. Sliding door or panel 112 may be held open or closed at a variety of vertical positions, for example using a locking device, clamp or similar mechanism 114. This would allow nonwovens of various thicknesses to be processed. Sliding door or panel 112 may itself be fluid-cooled.

Figure 7:
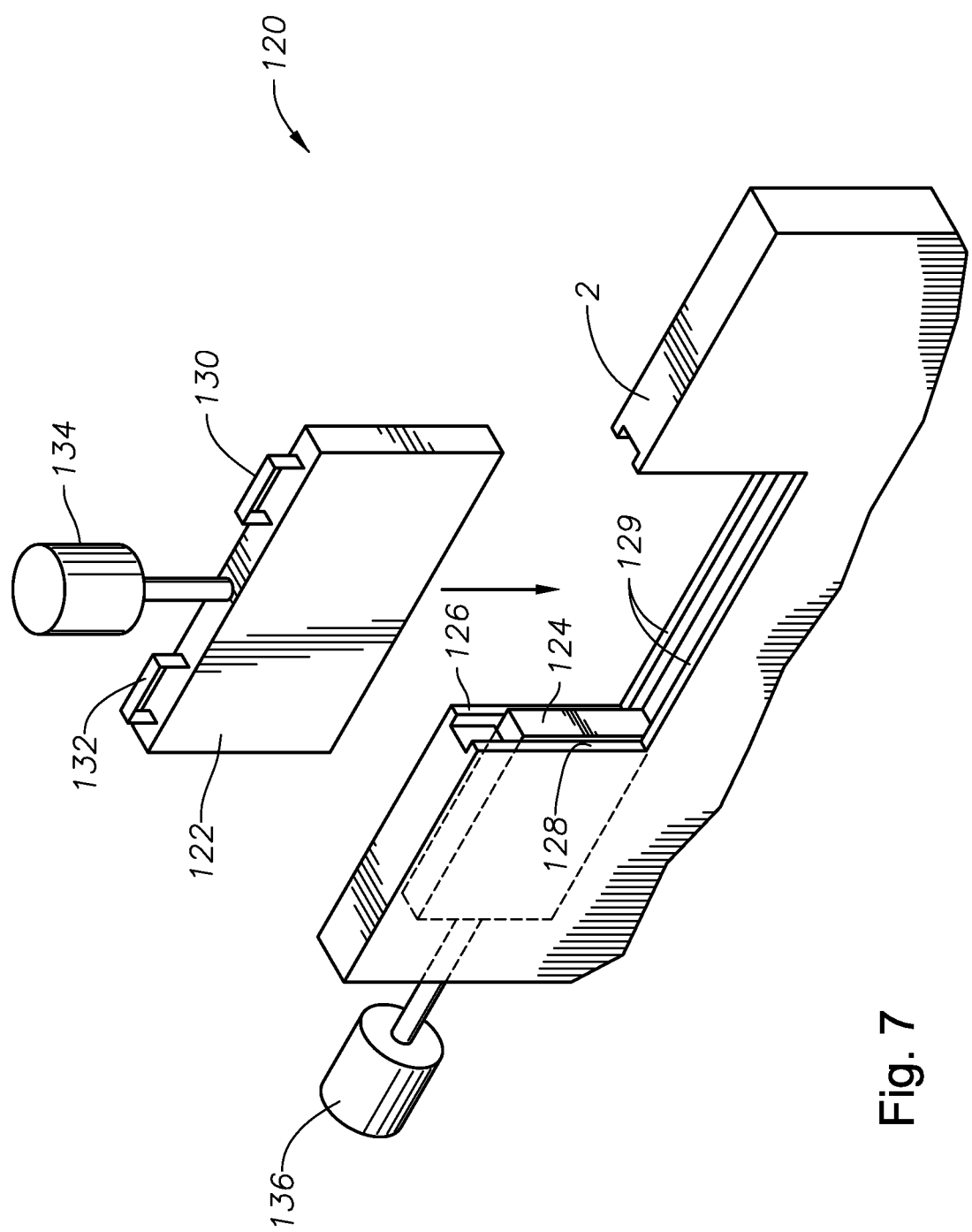

FIG. 7 illustrates a perspective view of yet another embodiment 120 of a slot useful in the apparatus and methods of this disclosure. Embodiment 120 comprises a vertically sliding door or panel 122, and a horizontally sliding door or panel 124. Vertical door or panel 122 slides in vertical guides 126, 128, while horizontal door or panel 124 slides in guides 129. In order to open and close, or adjust the height of vertical door or panel 122, handles 130, 132 may be provided. Alternatively, or in addition thereto, a pneumatic, hydraulic, or electronic actuator 134 may be provided. A similar actuator 136 may be provided to open, close, or adjust width of the slot. Embodiment 120 allows adjustment of either height, width, or both height and width to accommodate various stock sizes (not shown).

Figure 8:
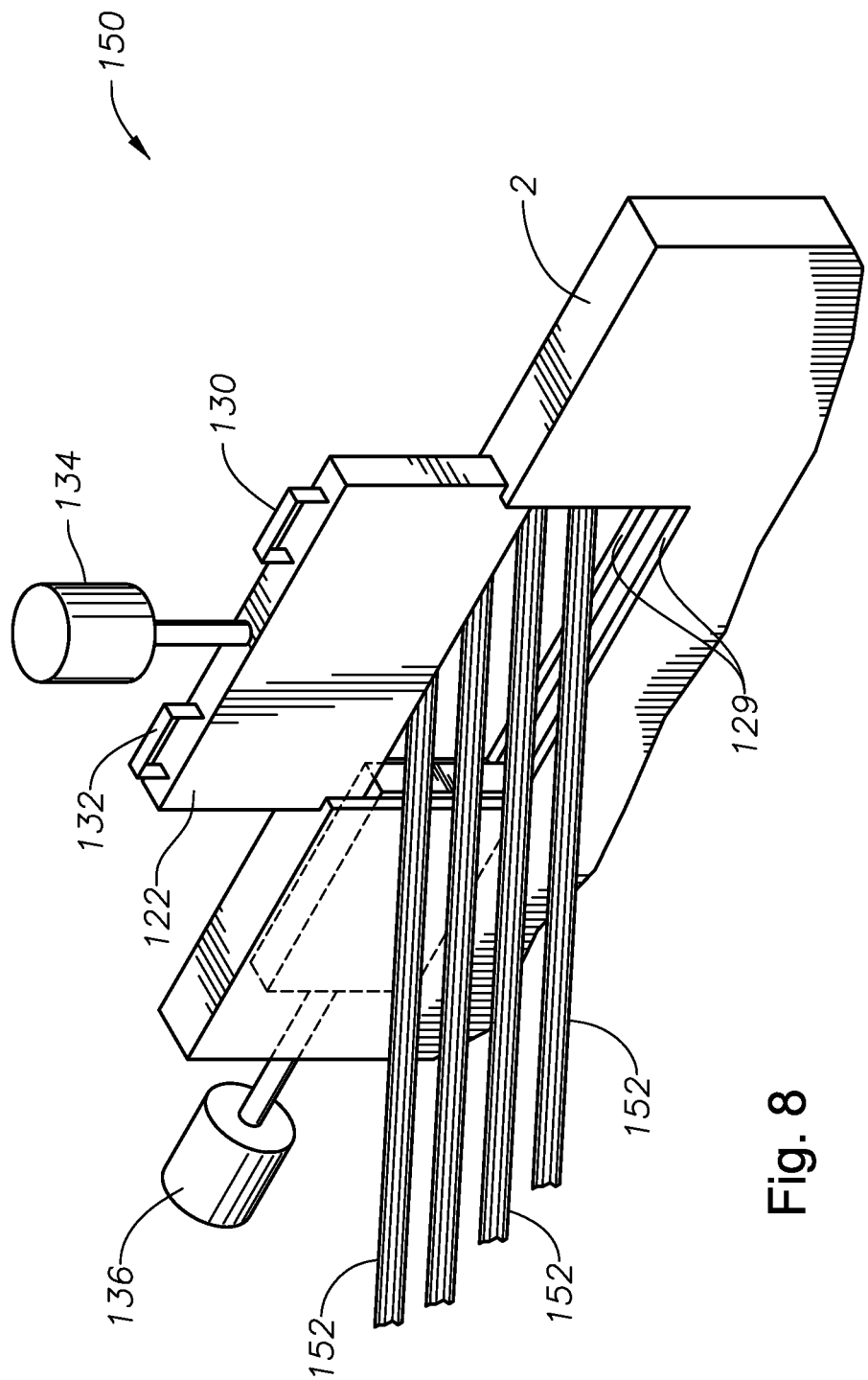

FIG. 8 illustrates a perspective view of yet another embodiment 150 of a slot useful in the apparatus and methods of this disclosure for melting one or more rovings 152 of glass fiber. In the case of rovings 152, the adjustable vertically sliding door or panel 122 and horizontally sliding door or panel 124 may be adjusted to accommodate different number and/or sizes of rovings.

Those having ordinary skill in this art will appreciate that there are many possible variations of the slot openings described herein, and will be able to devise alternatives and improvements to those described herein that are nevertheless considered to be within the claims of the present patent. For example, in the embodiments illustrated in FIGS. 7 and 8, a second vertical sliding door or panel could be provided, moving from the bottom of the slot up to meet the one illustrated, or this upwardly moving door or panel could completely replace the one illustrated. Similarly, a second horizontal sliding door or panel could be provided, sliding in from the right-hand side of the slot, or this sliding door or panel could replace the horizontal one illustrated. Sets of ceramic or metallic rollers could be provided to supplement the guides, or completely replace the guides.

Submerged combustion melters useful in the practice of the methods and apparatus of this description may take any number of forms, including those described n assignee's co-pending application Ser. No. 12/817,754, previously incorporated herein by reference, which describes sidewalls forming an expanding melting zone formed by a first trapezoidal region, and a narrowing melting zone formed by a second trapezoidal region, wherein a common base between the trapezoid defines the location of the maximum width of the melter.

Another important feature of apparatus of this disclosure is the provision of submerged combustion burners 8 in melter 2. In embodiments 100 and 200, burners 8 are floor-mounted burners. In certain embodiments, the burners may be positioned in rows substantially perpendicular to the longitudinal axis (in the melt flow direction) of melter 2. In certain embodiments, burners 8 are positioned to emit combustion products into molten glass in the melting zone of melter 2 in a fashion so that the gases penetrate the melt generally perpendicularly to the floor. In other embodiments, one or more burners 8 may emit combustion products into the melt at an angle to the floor, as taught in assignee's pending Ser. No. 12/817,754.

Melters useful in apparatus in accordance with the present disclosure may also comprise one or more wall-mounted submerged combustion burners, and/or one or more roof-mounted burners. Roof-mounted burners may be useful to pre-heat the melter apparatus melting zone, and serve as ignition sources for one or more submerged combustion burners 8. Melter apparatus having only wall-mounted, submerged-combustion burners are also considered within the present disclosure. Roof-mounted burners may be oxy-fuel burners, but as they are only used in certain situations, are more likely to be air/fuel burners. Most often they would be shut-off after pre-heating the melter and/or after starting one or more submerged combustion burners 8. In certain embodiments, if there is a possibility of carryover of particles to the exhaust, one or more roof-mounted burners could be used to form a curtain to prevent particulate carryover. In certain embodiments, all submerged combustion burners 8 are oxy/fuel burners (where "oxy" means oxygen, or oxygen-enriched air, as described earlier), but this is not necessarily so in all embodiments; some or all of the submerged combustion burners may be air/fuel burners. Furthermore, heating may be supplemented by electrical heating in certain embodiments, in certain melter zones. In certain embodiments the oxy-fuel burners may comprise one or more submerged combustion burners each having co-axial fuel and oxidant tubes forming an annular space therebetween, wherein the outer tube extends beyond the end of the inner tube, as taught in U.S. Pat. No. 7,273,583, incorporated herein by reference. Burners 8 may be flush-mounted with floor 7 in certain embodiments. In other embodiments, such as disclosed in the '583 patent, a portion of one or more of the burners 8 may extend slightly into the melt above floor 7.

In certain embodiments, melter side walls 5 may have a free-flowing form, devoid of angles. In certain other embodiments, side walls 5 may be configured so that an intermediate location may comprise an intermediate region of melter 2 having constant width, extending from a first trapezoidal region to the beginning of a narrowing melting region. Other embodiments of suitable melters are described in the above-mentioned '754 application.

As mentioned herein, useful melters may include refractory fluid-cooled panels. Liquid-cooled panels may be used, having one or more conduits or tubing therein, supplied with liquid through one conduit, with another conduit discharging warmed liquid, routing heat transferred from inside the melter to the liquid away from the melter. Liquid-cooled panels may also include a thin refractory liner, which minimizes heat losses from the melter, but allows formation of a thin frozen glass shell to form on the surfaces and prevent any refractory wear and associated glass contamination. Other useful cooled panels include air-cooled panels, comprising a conduit that has a first, small diameter section, and a large diameter section. Warmed air transverses the conduits such that the conduit having the larger diameter accommodates expansion of the air as it is warmed. Air-cooled panels are described more fully in U.S. Pat. No. 6,244,197, which is incorporated herein by reference. In certain embodiments, the refractory fluid cooled-panels are cooled by a heat transfer fluid selected from the group consisting of gaseous, liquid, or combinations of gaseous and liquid compositions that functions or is capable of being modified to function as a heat transfer fluid. Gaseous heat transfer fluids may be selected from air, including ambient air and treated air (for air treated to remove moisture), inert inorganic gases, such as nitrogen, argon, and helium, inert organic gases such as fluoro-, chloro- and chlorofluorocarbons, including perfluorinated versions, such as tetrafluoromethane, and hexafluoroethane, and tetrafluoroethylene, and the like, and mixtures of inert gases with small portions of non-inert gases, such as hydrogen. Heat transfer liquids may be selected from inert liquids which may be organic, inorganic, or some combination thereof, for example, salt solutions, glycol solutions, oils and the like. Other possible heat transfer fluids include steam (if cooler than the oxygen manifold temperature), carbon dioxide, or mixtures thereof with nitrogen. Heat transfer fluids may be compositions comprising both gas and liquid phases, such as the higher chlorofluorocarbons.

The feed slot described in accordance with the present disclosure may be constructed using refractory cooled panels. Both the feed slot and the side walls may include a thin refractory lining, as discussed herein. The thin refractory coating may be 1 centimeter, 2 centimeters, 3 centimeters or more in thickness, however, greater thickness may entail more expense without resultant greater benefit. The refractory lining may be one or multiple layers. Alternatively, melters described herein may be constructed using cast concretes such as disclosed in U.S. Pat. No. 4,323,718. The thin refractory linings discussed herein may comprise materials described in the 718 patent, which is incorporated herein by reference. Two cast concrete layers are described in the 718 patent, the first being a hydraulically setting insulating composition (for example, that known under the trade designation CASTABLE BLOC-MIX-G, a product of Fleischmann Company, Frankfurt/Main, Federal Republic of Germany). This composition may be poured in a form of a wall section of desired thickness, for example a layer 5 cm thick, or 10 cm, or greater. This material is allowed to set, followed by a second layer of a hydraulically setting refractory casting composition (such as that known under the trade designation RAPID BLOCK RG 158, a product of Fleischmann company, Frankfurt/Main, Federal Republic of Germany) may be applied thereonto. Other suitable materials for the refractory cooled panels, melter refractory liners, and refractory block burners (if used) are fused zirconia ($ZrO_2$), fused cast AZS (alumina-zirconia-silica), rebonded AZS, or fused cast alumina ($Al_2O_3$). The choice of a particular material is dictated among other parameters by the melter geometry and type of glass to be produced.

Burners useful in the melter apparatus described herein include those described in U.S. Pat. Nos. 4,539,034; 3,170,781; 3,237,929; 3,260,587; 3,606,825; 3,627,504; 3,738,792; 3,764,287; and 7,273,583, all of which are incorporated herein by reference in their entirety. One useful burner, for example, is described in the 583 patent as comprising a method and apparatus providing heat energy to a bath of molten material and simultaneously creating a well-mixed molten material. The burner functions by firing a burning gaseous or liquid fuel-oxidant mixture into a volume of molten material. The burners described in the 583 patent provide a stable flame at the point of injection of the fuel-oxidant mixture into the melt to prevent the formation of frozen melt downstream as well as to prevent any resultant explosive combustion; constant, reliable, and rapid ignition of the fuel-oxidant mixture such that the mixture burns quickly inside the molten material and releases the heat of combustion into the melt; and completion of the combustion process in bubbles rising to the surface of the melt. In one embodiment, the burners described in the 583 patent comprises an inner fluid supply tube having a first fluid inlet end and a first fluid outlet end and an outer fluid supply tube having a second fluid inlet end and a second fluid outlet end coaxially disposed around the inner fluid supply tube and forming an annular space between the inner fluid supply tube and the outer fluid supply tube. A burner nozzle is connected to the first fluid outlet end of the inner fluid supply tube. The outer fluid supply tube is arranged such that the second fluid outlet end extends beyond the first fluid outlet end, creating, in effect, a combustion space or chamber bounded by the outlet to the burner nozzle and the extended portion of the outer fluid supply tube. The burner nozzle is sized with an outside diameter corresponding to the inside diameter of the outer fluid supply tube and forms a centralized opening in fluid communication with the inner fluid supply tube and at least one peripheral longitudinally oriented opening in fluid communication with the annular space between the inner and outer fluid supply tubes. In certain embodiments, a longitudinally adjustable rod is disposed within the inner fluid supply tube having one end proximate the first fluid outlet end. As the adjustable rod is moved within the inner fluid supply tube, the flow characteristics of fluid through the inner fluid supply tube are modified. A cylindrical flame stabilizer element is attached to the second fluid outlet end. The stable flame is achieved by supplying oxidant to the combustion chamber through one or more of the openings located on the periphery of the burner nozzle, supplying fuel through the centralized opening of the burner nozzle, and controlling the development of a self-controlled flow disturbance zone by freezing melt on the top of the cylindrical flame stabilizer element. The location of the injection point for the fuel-oxidant mixture below the surface of the melting material enhances mixing of the components being melted and increases homogeneity of the melt. Thermal $NO_x$ emissions are greatly reduced due to the lower flame temperatures resulting from the melt-quenched flame and further due to insulation of the high temperature flame from the atmosphere.

The term "fuel", according to this disclosure, means a combustible composition comprising a major portion of, for example, methane, natural gas, liquefied natural gas, propane, atomized oil or the like (either in gaseous or liquid form). Fuels useful in the disclosure may comprise minor amounts of non-fuels therein, including oxidants, for purposes such as premixing the fuel with the oxidant, or atomizing liquid fuels.

The total quantities of fuel and oxidant used by the combustion system are such that the flow of oxygen may range from about 0.9 to about 1.2 of the theoretical stoichiometric flow of oxygen necessary to obtain the complete combustion of the fuel flow. Another expression of this statement is that the combustion ratio is between 0.9 and 1.2. In certain embodiments, the equivalent fuel content of the feed material must be taken into account. For example, organic binders in glass fiber mat scrap materials will increase the oxidant requirement above that required strictly for fuel being combusted. In consideration of these embodiments, the combustion ratio may be increased above 1.2, for example to 1.5, or to 2, or 2.5, or even higher, depending on the organic content of the feed materials.

The velocity of the fuel gas in the various burners depends on the burner geometry used, but generally is at least about 15 m/s. The upper limit of fuel velocity depends primarily on the desired mixing of the melt in the melter apparatus, melter geometry, and the geometry of the burner; if the fuel velocity is too low, the flame temperature may be too low, providing inadequate melting, which is not desired, and if the fuel flow is too high, flame might impinge on the melter floor, roof or wall, and/or heat will be wasted, which is also not desired.

In certain embodiments of the disclosure it may be desired to implement heat recovery. In embodiments of the disclosure employing a heat transfer fluid for heat recovery, it is possible for a hot intermediate heat transfer fluid to transfer heat to the oxidant or the fuel either indirectly by transferring heat through the walls of a heat exchanger, or a portion of the hot intermediate fluid could exchange heat directly by mixing with the oxidant or the fuel. In most cases, the heat transfer will be more economical and safer if the heat transfer is indirect, in other words by use of a heat exchanger where the intermediate fluid does not mix with the oxidant or the fuel, but it is important to note that both means of exchanging heat are contemplated. Furthermore, the intermediate fluid could be heated by the hot flue gases by either of the two mechanisms just mentioned.

In certain embodiments employing heat recovery, the primary means for transferring heat may comprise one or more heat exchangers selected from the group consisting of ceramic heat exchangers, known in the industry as ceramic recuperators, and metallic heat exchangers further referred to as metallic recuperators. Apparatus and methods in accordance with the present disclosure include those wherein the primary means for transferring heat are double shell radiation recuperators. Preheater means useful in apparatus and methods described herein may comprise heat exchangers selected from ceramic heat exchangers, metallic heat exchangers, regenerative means alternatively heated by the flow of hot intermediate fluid and cooled by the flow of oxidant or fuel that is heated thereby, and combinations thereof. In the case of regenerative means alternately heated by the flow of hot intermediate fluid and cooled by the flow of oxidant or fuel, there may be present two vessels containing an inert media, such as ceramic balls or pebbles. One vessel is used in a regeneration mode, wherein the ceramic balls, pebbles or other inert media are heated by hot intermediate fluid, while the other is used during an operational mode to contact the fuel or oxidant in order to transfer heat from the hot media to the fuel or oxidant, as the case might be. The flow to the vessels is then switched at an appropriate time.

Glass mat forming devices useful in the invention include slitting devices. These may be hot, cold, shear, or ultrasonic slitting devices, depending on the nature of the glass mat to be recycled. Slitting devices are commercially available, for example from AZCO Corp, Fairfield, N.J. (USA), under the trade designation ACU-SLIT™, and Automazioni Tessili Frigerio S.r.I., Via Giotto, 35-22075 Lurate Caccivio, Italy. AZCO Corp. also supplies a variety of roll handling equipment, such as unwinding equipment. Powered nip rolls are available from a variety of commercial sources, as are roll brakes. Roll handling equipment may comprise a roll chuck, a roll brake, and a safety chuck, useful with the roll stands 14 and unwind devices 15 illustrated in FIGS. 1 and 2. Suitable roll chucks include air-inflated bladder chucks having an air-inflated bladder (not illustrated) which engages an inside surface of a roll core when inflated. Such chucks are available from several commercial sources, including, for example, Double E Company, LLC, West Bridgewater, Mass. (USA). A suitable roll brake includes a series of heat transfer cooling fins illustrated inside a safety cage. Roll brakes are also available from many sources, including the Double E Company. A hand-held air nozzle and compressed air hose may be available locally at roll stands 14. Compressed air nozzles and hoses are useful for the operator for many reasons, including topping off the air in the air-inflated bladder chucks, if deemed necessary by the operator, blowing off accumulated dust from equipment and clothes, and the like. Safety chucks are known in the roll handling art and usually include a mechanism to safely immobilize the roll. Safety chucks are available in a variety of designs, and are available from many sources, including the aforementioned Double E Company.

Roll stand 14 may include a roll alignment sensor, sometimes referred to as an edge guide, which may include a servo cable allowing communication between the sensor and a roll stand controller (not illustrated) to maintain roll of glass mat material 16 unwinding with proper alignment.

Apparatus of this disclosure may further optionally comprise one or more idler rolls and one or more anti-static devices useful with roll stand 14 illustrated in FIGS. 1 and 2. One anti-static device may comprise a rigid delivery tube positioned near the glass mat web as it unwinds, which is connected to a flexible delivery tube which supplies ionized air or other ionized gas to the rigid tube. Ionized air or other ionized gas exits the rigid tube through a plurality of holes or through a ceramic frit material and onto the glass mat material to remove static electricity. Without static electricity reduction, subsequent forming steps and other movements could be difficult. In addition, static shocks to workers can be painful and otherwise disruptive ergonomically.

Powered nip rolls 24 (FIGS. 1 and 2) and alternatives mentioned herein may be controlled by a controller 300 as previously discussed. Nip rolls may be part of a nip roll assembly, comprised of one or more idler rolls. Nip roll pairs may be designed to move up and down when desired by the operator, upon command from a main controller, usually by compressed air-actuated cylinders. Nip rollers in nip roller pairs 24 are typically rubber or rubber-covered rolls, available from many commercial sources.

Although only a few exemplary embodiments of this disclosure have been described in detail above, those skilled in the art will readily appreciate that many modifications are possible in the exemplary embodiments without materially departing from the novel apparatus and processes described herein. Accordingly, all such modifications are intended to be included within the scope of this disclosure as defined in the following claims. In the claims, no clauses are intended to be in the means-plus-function format allowed by 35 U.S.C. §112, paragraph 6 unless "means for" is explicitly recited together with an associated function. "Means for" clauses are intended to cover the structures described herein as performing the recited function and not only structural equivalents, but also equivalent structures.

What is claimed is:

1. A method of recycling glass mat (18) materials, comprising:
   a) providing a source (16) of glass mat (18), wherein the glass mat (18) is selected from the group consisting of nonwoven and woven materials;
   b) routing the glass mat (18) at a substantially consistent feed rate into a submerged combustion melter (2) through a slot (26) in the melter (2) and then directly into a well-mixed mass of molten glass (4) within the melter (2) and melting the glass mat (18), wherein the melting comprises at least one burner (8) directing combustion products into a melting zone under a level (6) of the well-mixed molten glass (4) in the zone, and wherein the routing comprises unwinding the glass mat (18) off of a roll (16) of glass mat using an unwind system (14, 15) and a mechanism (24) selected from the group consisting of a pair of powered nip rolls, a nip compression conveyor, and opposed conveyors compressing the product.

2. The method of claim 1 wherein the glass mat (18) is routed through a forming device (20) prior to entering the powered nip rolls (24) so that the glass mat (18) fits through the slot (26).

3. The method of claim 1 wherein the glass mat (18) is cut to width prior to entering the powered nip rolls (24) so that it fits through the slot (80, 90, 110, 120 150).

4. The method of claim 1 wherein the providing the source (16) of glass mat (18) comprises providing a web of substantially continuous glass fibers bound together randomly at points where adjacent fibers touch using a binder.

5. The method of claim 1 wherein the unwinding of the glass mat (18) comprises splicing a first web unwinding from a first roll to a second web unwinding from a second roll.

6. A method of glass fiber roving (152) materials, comprising:
   a) providing a source (16) of glass fiber roving (152);
   b) routing the glass fiber roving (152) at a substantially consistent feed rate into a submerged combustion melter (2) through a slot (26) in the melter (2) and then directly into a well-mixed mass of molten glass (4) within the melter (2) and melting the glass fiber roving (152), wherein the melting comprises at least one burner (8) directing combustion products into a melting zone under a level (6) of the well-mixed molten glass (4) in the zone, and wherein the routing comprises unwinding the glass fiber roving (152) off of a roll (16) glass fiber roving using an unwind system (14, 15) and a mechanism (24) selected from the group consisting of a pair of powered nip rolls, a nip compression conveyor, and opposed conveyors compressing the product.

7. The method of claim 6 wherein the glass fiber roving (152) is routed through a forming device (20) prior to entering the powered nip rolls (24) so that the glass fiber roving (152) fits through the slot (26).

* * * * *